UNITED STATES PATENT OFFICE.

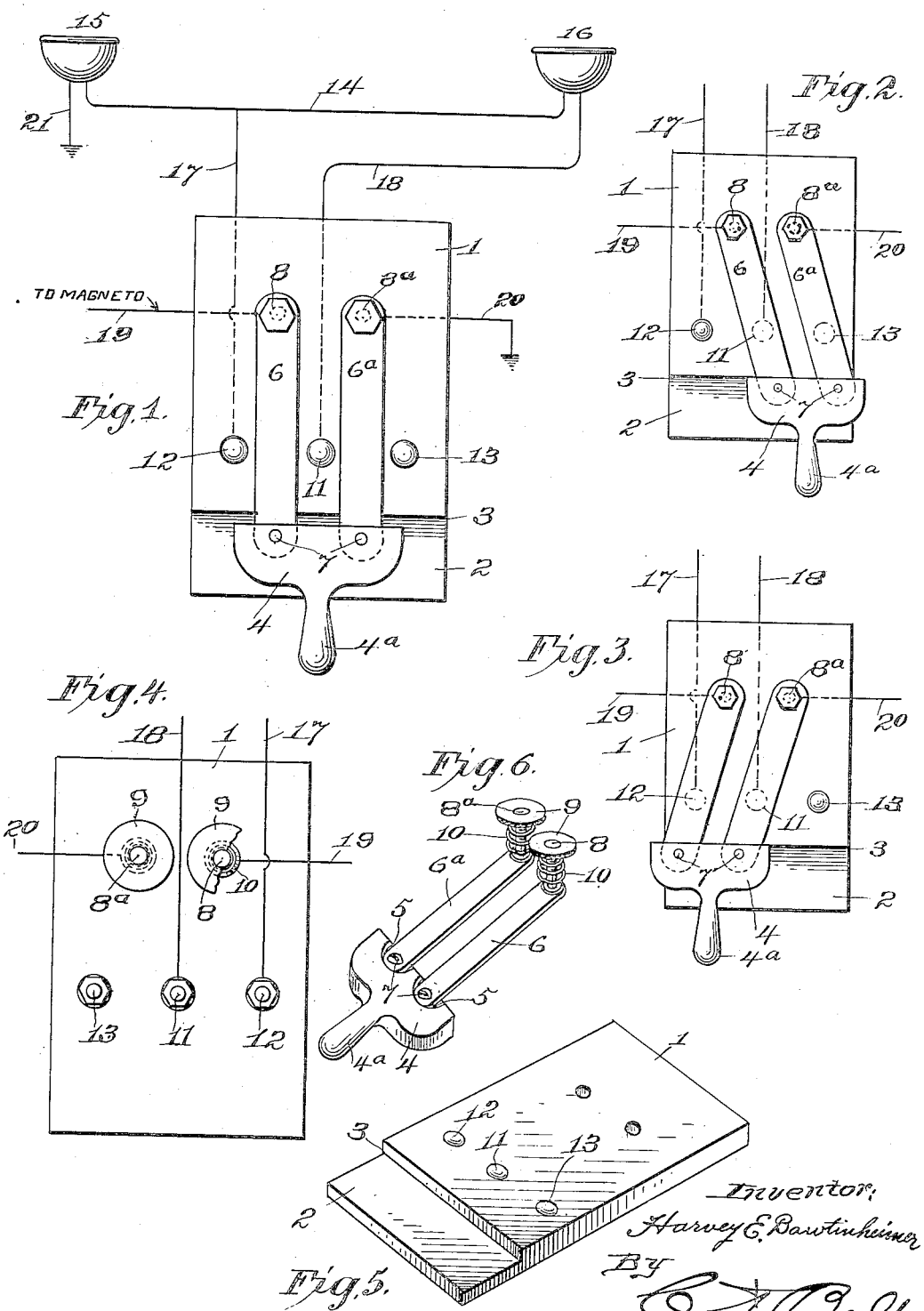

HARVEY E. BAWTINHEIMER, OF RED DEER, ALBERTA, CANADA.

HEADLIGHT-SWITCH FOR AUTOMOBILES.

1,272,893.  Specification of Letters Patent.  Patented July 16, 1918.

Application filed July 21, 1917. Serial No. 182,087.

*To all whom it may concern:*

Be it known that I, HARVEY E. BAWTINHEIMER, a subject of the King of England, and residing at Red Deer, in the Province of Alberta and Dominion of Canada, have invented certain new and useful Improvements in Headlight-Switches for Automobiles, of which the following is a specification.

This invention relates to electric switches for automobile head lamps, and pertains especially to a switch electrically connected with a magneto and with said lamps, for maintaining uniform brilliancy of the lamp lights under varying power conditions.

It is well known that in certain automobiles, especially of the Ford type, the current for the head lights is generated from a magneto by "wiring in series" so that the strength or brilliancy of the lights, or the amount of current generated for the head lights depends upon the speed at which the automobile engine is running, and for this reason the strength or brilliancy of the lights varies according to the rate of speed given the automobile by its engine. Ordinarily it has been found that when a motor car, such as the Ford, is running in low gear and the engine at high speed, the current is sufficient to produce a strong or brilliant light, but when the car is being propelled under moderate speed, or low speed, the current varies and is not sufficient to produce proper and necessary head lights of sufficient strength to be used especially in country motoring. Therefore it is the purpose of my invention to overcome such light variations, by increasing the power of and operating electric lights, either in series, or in supplying and operating the lights separately and independently one of the other, and to furnish means whereby the light currents are not affected by shifting the gear for high, moderate, or low speed.

Various other objects and advantages are attainable in the practical production and application of the invention, hereinafter fully described.

In the accompanying drawings forming part of this application:—

Figure 1 is a top plan view showing my invention applied to a pair of head lights.

Figs. 2 and 3 are similar views showing the positions of the switch members for feeding the current under different speeds of an automobile.

Fig. 4 is an inverted plan view of the switch showing the various wires connected therewith.

Fig. 5 is a detail perspective view of the switch plate.

Fig. 6 is a detail perspective view of the switch levers.

The same reference characters denote the same parts throughout the several views of the drawings.

Obviously the switch plate 1 may be placed in the usual position convenient for the operator or driver, as found in the Ford types of automobiles. The plate 1 has an off-set member 2, and is provided with a shoulder 3, the purpose of which will hereinafter be stated. The head 4 of the hand lever $4^a$ of the switch has two sockets 5, in which one end of plate levers 6 and $6^a$ are pivoted at 7, and the other end of said levers is pivoted on posts 8 and $8^a$, which extend through the plate 1 and have the usual adjusting nut 9 and coil wire 10.

The face of the lever head 4 adjacent to the shoulder 3 is straight, and said shoulder being straight, the movement of the head is limited or stopped by engaging said shoulders, and the reason for stopping the movement of said head will hereinafter be given.

The switch plate is provided with two electric terminals or poles 11 and 12, and a blank pole 13, all of which extend through the plate and are arranged in a row or line parallel with the shoulder 3, and the head of said poles is raised above the face of the plate 1 so as to form contacts for the levers 6 and $6^a$. The poles are spaced apart so as to provide an interval between them for placing the levers 6 and $6^a$ out of contact with the poles.

The system of wiring comprises a wire 14 connecting the head lights 15 and 16, a wire 17 connecting the terminal pole 12 with the wire 14, a wire 18 connecting the head light 16 with the pole 11, a wire 19 for connecting the terminal post 8 with a magneto, a ground wire 20 attached to the post $8^a$, and a ground wire 21 attached to the head light 15. The function of the blank pole 13 is to balance or steady the levers 6 and $6^a$, when the lever 6 is in contact with the pole 11.

When the lever head 4 is moved from the position shown in Fig. 1 of the drawings to the position shown in Fig. 2, so that the levers 6 and $6^a$ are in contact with the poles 11 and 13 respectively, the poles 8 and 11 are connected for lighting both head lights as in the Ford "series" system, but when the lever head is moved so as to have the levers 6 and 6ᵃ contact with the poles 12 and 11 respectively, as shown in Fig. 3, the lighting current is supplied to both head lights from the pole 12 through the wire 17 to the wire 14 connecting the head lights. With the levers in this last mentioned position, the left hand head light 15 already being grounded, the right hand head light 16 becomes grounded through the lever 6ᵃ connecting the center pole 11 and the ground pole 8ᵃ, so that the electric current to the head lights is increased or practically doubled, and the lights are maintained at uniform brilliancy during this position of the levers.

Obviously either separate or "series" wiring may be employed as desired or as occasion may demand.

I do not wish to be understood as confining the invention to any particular size, shape or material, nor to the position of the switch, nor to the application of the invention in practical use, but reserve the right to make such various applications of the invention, and such changes and variations therein as may come within the scope of the appended claim.

Having thus described my invention what I claim as new and desire to secure by Letters Patent is:—

In an electric switch, a switch plate having an off-set member and a shoulder, a pair of terminal poles in the plate, a pair of levers pivoted on the plate and adapted to be connected respectively for grounding and with a magneto, and a hand lever having said levers fulcrumed thereto and working on the offset member for engaging the shoulder to limit the movement of said levers with respect to the terminal poles.

In witness whereof I hereunto set my hand in the presence of two witnesses.

HARVEY E. BAWTINHEIMER.

Witnesses:
 CHARLES T. ELIVE,
 GEORGE F. ELY.